Feb. 12, 1924.
S. A. SLAUSON
1,483,317
CONNECTING ROD BOLT
Filed June 30, 1922
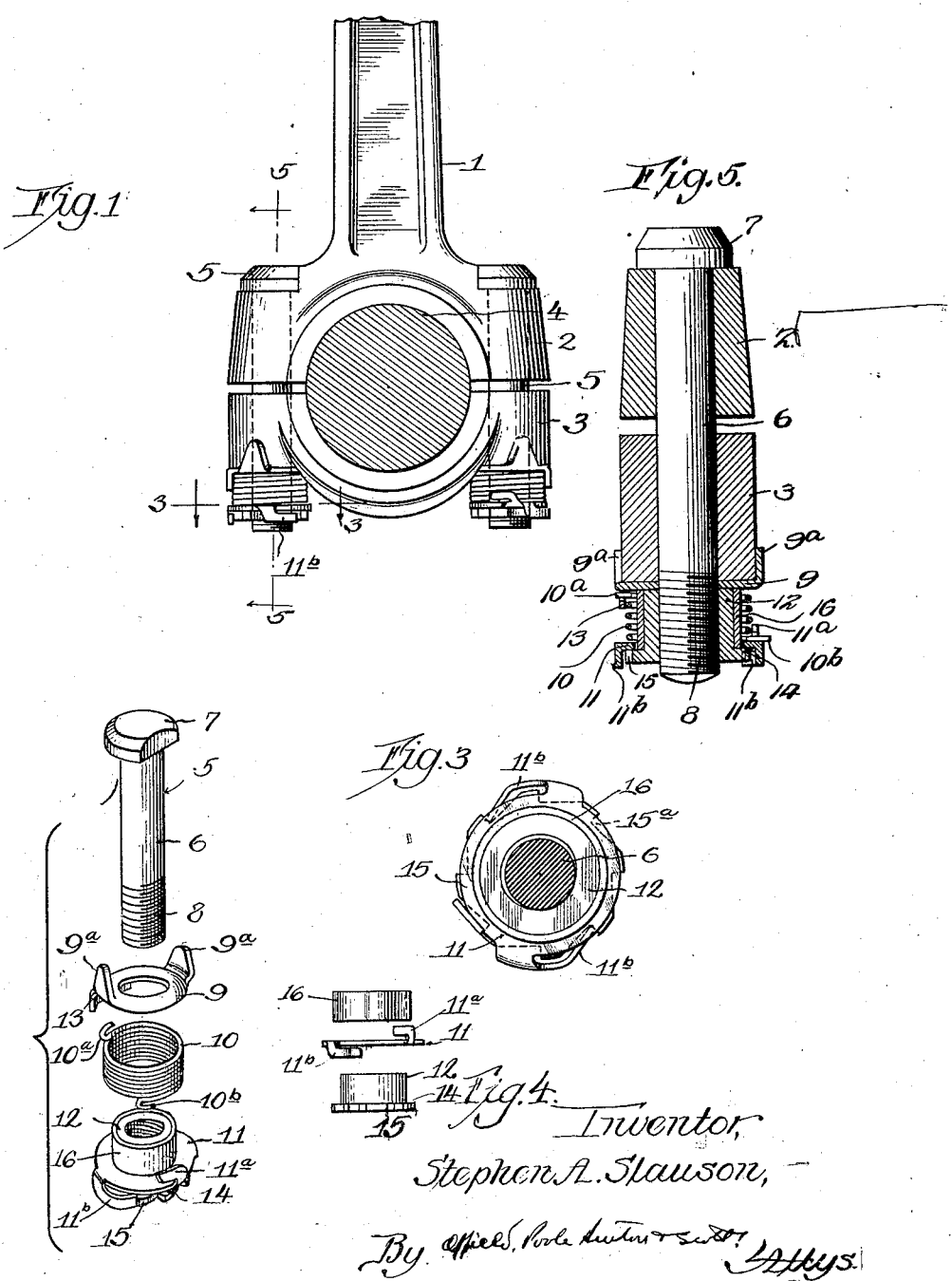
Inventor,
Stephen A. Slauson, Patented Feb. 12, 1924.                                              1,483,317

UNITED STATES PATENT OFFICE.

STEPHEN A. SLAUSON, OF CEDAR RAPIDS, IOWA, ASSIGNOR OF TWENTY-FIVE ONE-HUNDREDTHS TO JOHN H. BROOKMAN AND TWENTY-FIVE ONE-HUNDREDTHS TO L. O. HATCH, BOTH OF CEDAR RAPIDS, IOWA.

CONNECTING-ROD BOLT.

Application filed June 30, 1922. Serial No. 571,955.

*To all whom it may concern:*

Be it known that I, STEPHEN A. SLAUSON, a citizen of the United States, and a resident of Cedar Rapids, in the county of Linn and State of Iowa, have invented certain new and useful Improvements in Connecting-Rod Bolts, of which the following is a specification.

This invention relates to improvements in automatic take-up bolts for connecting rods and the like, and more particularly to the type described and illustrated in a prior application filed by me on the 29th day of April, 1922, and bearing Serial Number 557,429.

The object of the present invention is to provide an improved construction for a bolt of the character described, including a rotative collar mounted on the nut of the bolt and having a pawl and ratchet engagement therewith, said collar having one end of the take-up spring connected thereto, whereby the latter may be more easily placed under tension.

Other objects of the invention will be brought out in the description to follow, and in connection with the accompanying drawings, wherein—

Figure 1 is a general view in end elevation of the crank end of a connecting rod, with bolts applied.

Figure 2 is a view in perspective of a complete bolt with parts disassembled, but positioned in the order of their assembly.

Figure 3 is an enlarged detail view of the collar and coacting nut, as taken on line 3—3 of Figure 1.

Figure 4 is a view in elevation of the nut with parts disassembled.

Figure 5 is an enlarged detail view in vertical section taken on line 5—5 of Figure 1.

Figure 1 illustrates a typical connecting rod 1 having at its lower end an integral bearing box 2, forming the upper half of the complete bearing. An adjustable bearing box or cap 3 is bolted to the under side of the bearing box 2, and forms the lower half of the bearing, surrounding the crank pin 4. Bolts 5—5 extend through the two halves of the bearing in the usual manner, and are located on opposite sides of the crank pin. The two halves of the bearing 2 and 3 are preferably shown as spaced apart along the line of parting, the usual practice being to insert shims within the spaces to a thickness to afford a snug working fit between the bearing surfaces. These shims are, however, omitted when the type of bolt embodying the invention is used.

A bolt 5 comprises a shank 6, having a head 7 at one end, and a threaded portion 8 at the other end, the latter portion being adapted to receive the parts now to be described in the order of their application; to wit, a washer or anchor plate 9, a coil spring 10, the ratchet collar 11, and a special nut 12. The anchor plate 9 is an annular member, slightly concave, and having a central opening. A pair of integral ears $9^a$—$9^a$ project axially from opposite sides of the periphery of the plate, and between them a marginal flange 13 extending in the opposite direction; namely, toward the coil spring 10. As clearly shown in Figures 1 and 2, the plate is applied with the ears $9^a$—$9^a$ foremost, the same embracing the cylindric portions of the lower bearing cap in axial alignment with the bolts. The coil spring 10 consists of several turns of relatively light spring material, wound to a normal diameter considerably greater than the diameter of the bolt shank 6. The ends of the spring are provided with hooks $10^a$ and $10^b$, the foremost hook $10^a$ being adapted for connecting with the plate 9 by means of a small hole punched through one end of the flange 13.

The ratchet collar 11 so called because of its action upon the nut 12, consists of a flat ring, preferably stamped from spring steel, and having at its periphery an integral upwardly bent hook $11^a$ opening in the opposite direction to the hooked end $10^b$ of the spring 10. Spaced from the hook $11^a$ at angles of substantially 90°, and at points diametrically opposed to each other are spring fingers $11^b$—$11^b$ likewise formed integral with the periphery of the ring, and bent downwardly at right angles to said ring, in the opposite direction from the hooks $11^a$, so that they project from the other side toward the nut 12. These spring fingers extend circumferentially in the same directions namely, counter-clockwise (Figure 2), and substantially in alinement with the periphery of the ring, although in the forming operation the fingers are bent inwardly from the arc of the periphery at a point intermediate their ends, thus providing inwardly extending free end portions.

The nut 12 is somewhat different from the ordinary nut, consisting of a cylindric body portion 14 having the usual tapped or threaded bore, and at one end an integral radial flange 15 in which are cut a series of peripheral notches 15ª and opening in the direction that the nut would be turned in screwing the same on to the bolt. In applying the nut 12, the cylindric portion is positioned in advance of the disc 15, so that the former telescopes within the spring 10, which in turn fits within the concave surface of the plate.

The mode of application of the bolt is quite apparent the bolt proper being inserted downwardly through the two halves of the bearing, and the washer 9, spring 10 and nut 11 applied to the projecting threaded portion in order named. The plate 9 immediately anchors itself in non-rotative engagement with the cap 3 through the medium of the ears 9ª—9ª. The spring 10 is first applied without tension and connected to the plate 9, in the manner already pointed out.

The ratchet collar is applied to the nut 12 before the latter is screwed onto the bolt, this being done by slipping the cylindric portion through the collar with the spring fingers yieldingly engaging the notched periphery of the flange 15, with the ends thereof in position to abut against the radial faces thereof, as clearly shown in Figure 3, thus locking the nut and collar from relative rotation in one direction. To secure the collar in position adjacent the flange 15, a ring or band 16 is pressed onto the cylindric body of the nut after said collar has been applied, there being thus provided a groove between the forward edge of the band and the flange in which the collar may turn freely.

The nut with the collar applied is then screwed onto the bolt passing within the spring 10, and finally abutting against the anchor plate 9, the nut being screwed firmly in place, the outer hooked end 10ᵇ of the spring is hooked over the hook 11ª of the ratchet collar. By turning the collar in the direction to wind up the spring 10, the latter is thereby placed under tension, it being observed that the direction of winding is in the same direction as the nut is turned to remove or back it off of the bolt. Hence care should be taken to tighten the nut sufficiently before winding the spring so that during the operation of winding the nut will not at the same time back off the bolt or become loosened.

During the turning of the ratchet collar in the direction to wind the spring, the spring fingers 11ᵇ ride over the notches, in a true ratchet manner. Should the collar slip from the fingers of the person turning the collar, the spring fingers would immediately lock with the adjacent notches, and hold the spring from unwinding. Likewise, when the spring is tightly wound, it is only necessary to release the collar, and it automatically locks, and the bolt is in readiness to perform its function.

The intermediate ratchet collar between the spring and nut, provides a convenient and practical means for winding the spring, as well as a positive safeguard against the spring being accidentally released during the winding operation as heretofore carried out, and springing the same permanently out of shape as the result. Furthermore the ends of the spring are securely anchored at all times thus avoiding any uncertainty in the winding operation. It is also an advantage to have the free end of the spring carried around the nut in an arc of small radius thereby eliminating the possibility of the same being bent or springing out of shape, by careless manipulation.

If desired, the nut may be provided with locking devices, whereby the nut cannot back off of the bolt or be turned in a direction to become loosened. However, the use of a lock nut is not essential, in connection with the ratchet collar, except that it eliminates any possibility of the nut turning back, during the rotation of the ratchet collar in winding the spring.

Having described the improvement embodying the invention, and the advantage thereof.

I claim;

1. A device of the character described, comprising a connecting bolt and a nut therefor, a coil spring surrounding said nut, means for anchoring the end of said spring distant from said nut, a collar mounted on said nut and connected with the free end of said spring, said collar being rotative on said nut for winding said spring, and means for locking said collar from rotation on said nut under the tension of said spring.

2. A device of the character described, comprising a connecting bolt and nut, a coil spring for winding said nut, means for anchoring one end of said spring, a collar rotatively mounted on said nut and adapted for connection with the free end of said spring, said collar and nut being provided with coacting members for locking said collar from rotation in the direction to permit said spring to unwind.

3. In a device of the character described, the combination of a connecting bolt and nut, the latter being adapted to be tightened against one of two connected members, a coil spring surrounding said nut and adapted to be anchored at one end to the adjacent connected member, and a collar mounted on said nut and connected at its periphery with the other end of said spring, said collar being provided with members adapted to coact with notches in the periphery of said nut, for locking said collar from turning on said nut under the tension of said spring.

4. In a device of the character described, the combination of a connecting bolt and nut, a spring anchored at one end, means for winding said spring comprising a collar rotatably mounted on said nut and adapted for detachable connection with the free end of said spring, said nut and collar being provided with coacting notches and locking member for locking said collar from rotation in the direction of unwinding of said spring.

5. In a device of the character described, the combination of a bolt and nut, a coil spring encircling said bolt and nut, means for anchoring one end of said spring, and a rotative collar mounted on said nut and having detachable connection with the other end of said spring, said nut and collar having coacting pawl and ratchet members acting to lock said collar from rotation in a direction to permit said spring to unwind.

6. In a device of the character described, the combination of a bolt and nut, a coil spring encircling said bolt and adapted to be anchored at one end, a collar mounted on said nut and having a hook at the periphery thereof for detachable connection with the free end of said spring, and a spring finger engaging circumferentially arranged notches on said nut whereby said collar is locked from turning in a direction opposite to that for winding said spring.

7. In a device of the character described, the combination of a bolt and a nut for connecting two parts together, an anchor plate mounted on said bolt and engaging one of said parts, a coil spring encircling said bolt and fixed at one end to said anchor plate, a ratchet collar mounted on said nut and adapted for detachable connection with the adjacent end of said spring, said collar having integral spring fingers positioned in radial alinement with periphery notches formed on said nut, said spring fingers and notches being arranged to permit said collar to be turned to wind said spring and to lock said collar from turning in the opposite direction.

8. In a device of the character described, the combination with a bolt, of a nut having ratchet teeth arranged circumferentially thereof, a collar rotatably mounted on said nut and provided with spring fingers adapted to engage said notches to lock said collar against turning in one direction on said nut, and a metal band surrounding said nut on the opposite side of said collar.

9. In a device of the character described, the combination of a cylindric nut having a radial flange at one end thereof and ratchet teeth cut in said flange, a collar rotatably mounted on said nut adjacent said flange and comprising spring fingers adapted to engage said teeth, a metal band surrounding said nut on the opposite side of said collar, and a coil spring surrounding said nut and bolt and having detachable connection with said collar at its free end, whereby said spring is wound by the turning of said collar.

In witness whereof, I hereunto subscribe my name this 24th day of June, A. D. 1922.

STEPHEN A. SLAUSON.